Aug. 8, 1950  E. W. TILLYER  2,517,609
MULTIFOCAL APHAKIC LENS
Filed Aug. 2, 1945  2 Sheets-Sheet 1

INVENTOR.
E. WILLIAM TILLYER
BY
Louis L. Gagnon
ATTORNEY

Aug. 8, 1950  E. W. TILLYER  2,517,609
MULTIFOCAL APHAKIC LENS
Filed Aug. 2, 1945  2 Sheets-Sheet 2
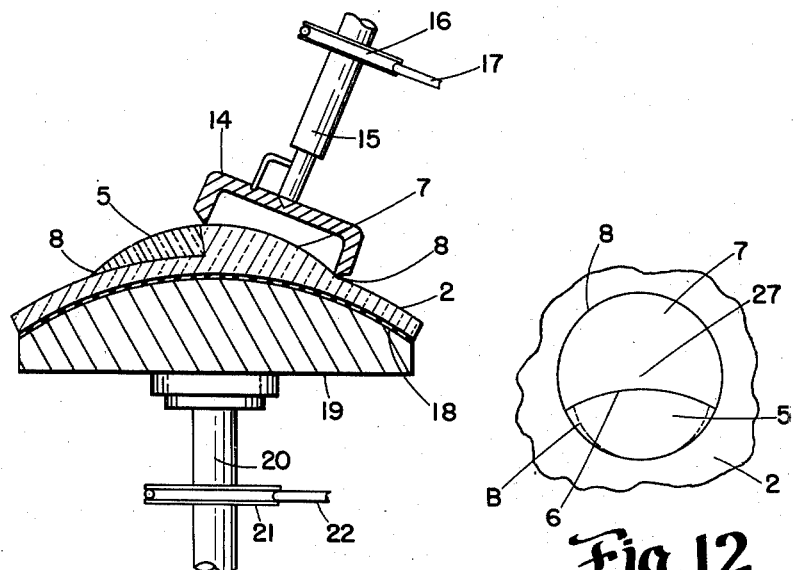
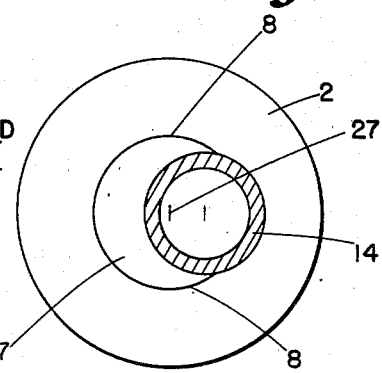
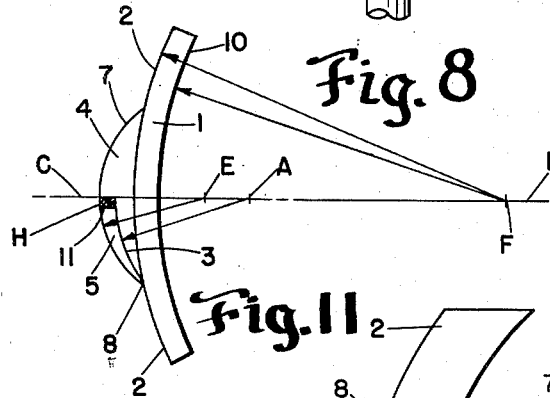
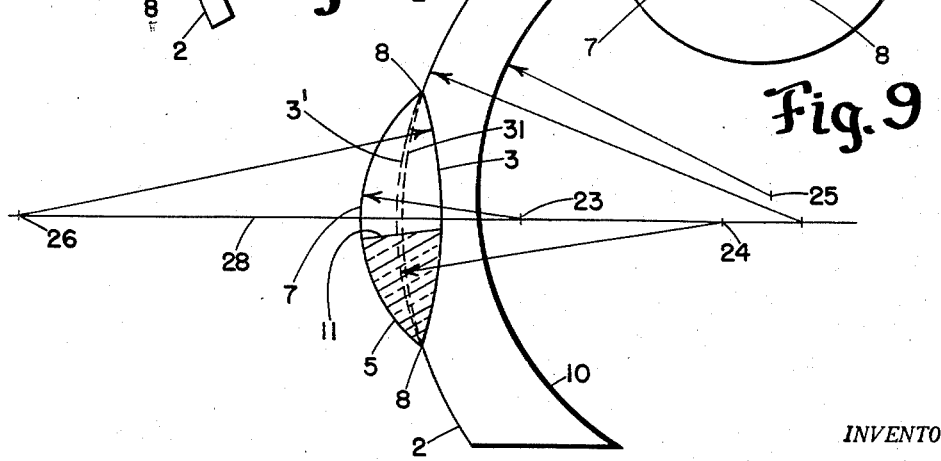
INVENTOR.
E. WILLIAM TILLYER
BY Louis L. Gagnon
ATTORNEY Patented Aug. 8, 1950

2,517,609

UNITED STATES PATENT OFFICE 2,517,609

MULTIFOCAL APHAKIC LENS

Edgar William Tillyer, Southbridge, Mass., assignor to American Optical Company, Southbridge, Mass., a voluntary association of Massachusetts Application August 2, 1945, Serial No. 608,407

1 Claim. (Cl. 88—54)

This invention relates to improvements in multifocal lenses, and particularly to lenticular multifocal cataract lenses.

A principal object of the invention is to provide an improved multifocal lenticular cataract lens.

Another object of the invention is to provide an improved lens blank for a multifocal lenticular cataract lens with the multifocal side finished and the opposite side left unfinished so the prescription dispenser may put on the prescription surface on the side opposite the multifocal surface to adapt the blank to the finished lens required by the prescription.

Another important object of the invention is to provide an improved lenticular cataract lens having a multifocal segment portion giving a wide field of vision so necessary to patients requiring cataract lenses with the optical centers of the distance and multifocal portion so related that there will be a very slight if any prismatic displacement of image in passing from one field to the other.

Another principal object of the invention is to provide a wide field multifocal portion the centers of whose curvatures for its front and back surfaces lie substantially on the straight axial line passing through the centers of curvature of the front and back surfaces of the distance power portion of the lens.

Another object of the invention is to place the top line of the multifocal portion below the optical center of the distance power portion of the lens to avoid confusion of vision.

Another object of the invention is to provide a lenticular cataract lens with a multifocal portion wherein the centers of curvature of the front and back surfaces of the distance power portion, the centers of curvature of the front and back surfaces of the lenticular portion, and the centers of curvature of the front and back surfaces of the multifocal near vision segment portion all lie substantially on a straight line passing through the centers of curvature of the front and back surfaces of the central power portion of the lens.

Another object of the invention is to provide a multifocal segment portion in a lenticular cataract multifocal lens that is substantially monaxial with the central power portion of the lens to avoid a substantial prismatic displacement between the fields.

Another object of the invention is to provide in a lens of this character a wide field multifocal near vision portion, spaced below and separated from the optical center of the power or distance vision portion of the lens and that is substantially monaxial with the said power or distance vision portions.

Other objects and advantages of the invention will become apparent from the following description taken in conjunction with the accompanying drawings. It will be apparent that many changes may be made in the details of construction and the arrangements of parts, and in the steps of the processes for making the invention without departing from the invention as set forth in the accompanying claim as the preferred forms and arrangements, means and methods have been set forth by way of illustration only.

In the past, cataract prescription multifocal lenses have been made specially to prescription by the lens manufacturer. This has meant a long delay to the patient and a great expense in the dispensing of these lenses, and the multifocal portion was of a relative size too small in extent for the requirements of cataract patients.

The dispensation of regular and single vision prescription lenses in the art has been through the prescription dispensers and not by the lens manufacturer.

Cataract lenses and particularly multifocal cataract lenses have in the past been provided specially by the lens manufacturers owing to the complicated and difficult operations of making these lenses, and these lenses have been different from the lens of this invention.

These lenses may be dispensed by the prescription dispensers just as regular and single vision lenses are dispensed by the dispensers.

It is important too to provide in such lenses a wide field for the multifocal portion of the lens because of the severe conditions under which vision is obtained by one who has been operated on for cataract. This wide field segment in this invention is provided and located slightly below the optical center of the distance power portion of the lens and so related as to be substantially monaxial with the said distance portion thereby substantially removing prismatic displacement between the fields.

This type of lenticular multifocal cataract lens is a new and novel feature of this invention.

Referring to the drawings:

Fig. 8 is an elevation partly in cross section showing the ring tool finishing of the power and multifocal portions of the lens of the invention.

Fig. 9 is a top or plan view of Fig. 8, showing the ring tool in cross section;

Fig. 10 is a diagrammatic view in elevation showing the centers of curvatures of the various surfaces of the lens and the optical axes thereof;

Fig. 11 is a diagrammatic elevation showing the centers of curvature of the various surfaces and their optical axes; and Fig. 12 is a front view of the segment portion of Fig. 11.

Referring to the drawings in which similar reference characters denote corresponding parts throughout:

Figure 1:
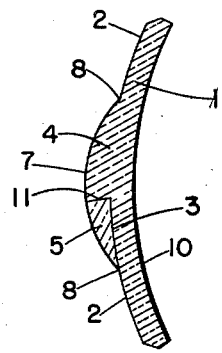
Fig. 1 is a cross section of a lenticular multifocal cataract lens of the invention.

The lens blank is produced by forming a base portion 1 of the lens with a finished optical surface 2 on one side of a piece of lens medium, preferably of an ophthalmic crown glass with the addition of from 1 to 15 per cent of a sensibly pure cerium oxide which has the property of absorbing the ultra-violet radiations of light. This absorption of the ultra-violet radiations is important because, as has been held by eminent medical authority, the iris of the eye is the medium of the eye which is absorbent of the ultra-violet radiations and if this iris is removed, as it is, in the cataract operation, there is nothing left in the eye to absorb these radiations and there is danger that the ultra-violet radiations will cause the retina of the eye to disintegrate.

This lens medium is substantially colorless and it has been found from trial that where from 2 to 4 per cent of the said cerium oxide is added the lens medium will not transmit more than 5 per cent of the ultra-violet radiations at a wave length of 356 m$\mu$, or shorter, for a 2 millimeter thickness of the lens medium.

As stated above, this lens medium is substantially colorless when the medium is looked through. Its edges, however, show a very faint yellowish tint, which is not perceptible when looking through or viewing the lens from its lens surfaces.

The surface 2 is not a visual surface but is for the lenticular or outer part of the lens, to give size for mounting the lens. Its function is to lighten the weight of the lens so it may be comfortably worn.

Into the face of the surface 2, a circular seat 3 is finished. This seat is designed to receive the multifocal segment and power portion of the lens.

This seat 3 is of great importance for its curvature 3 determines the power of the multifocal segment 5 of the lens. This is illustrated in Fig. 10. If a seat having the curvature 3 shown in full line the multifocal segment part will be as indicated in cross-hatched portion. The segment will have an outer surface 5 with center at 23 and an inner surface 3 with center at 26. The surface of the seat 3 has to be varied to fit the power required in the multifocal segment portion, as for example, the surface 3 may be varied as shown by the dotted line 3', that is from concave to a convex surface. The multifocal power determines the surface of the seat 3.

Figure 4:
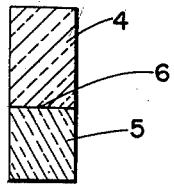
Fig. 4 is a vertical cross section through Fig. 4.
Figure 5:
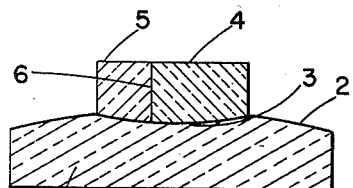
Fig. 5 is a cross section of a blank for the lens of the invention showing the segment portion fused to the base portion of the lens blank.
Figure 6:
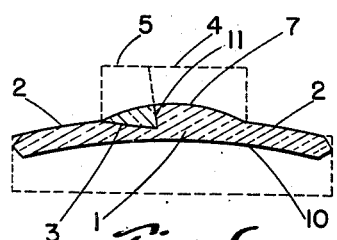
Fig. 6 is a cross section of a finished lens of the invention showing in dotted lines the parts of the blank that have been removed.

The multifocal segment and power portion of the lens is made as shown in Figs. 4 and 5 by making a circular blank comprised of two pieces of different kinds of lens mediums. The upper part 4 of the segment is made of the same kind of lens medium as the base portion 1 of the lens. The reason for this will be set forth hereunder.

The lower part 5 of the segment is of a different kind of glass from that of the part 4. The part 5 is made of a barium crown glass having an index of refraction of substantially 1.616, while the parts 4 and 1, have an index of refraction of substantially 1.523.

These two mediums, it has been found from experience, fuse perfectly together, and their relative expansions and dispersions are so related that the parts will remain securely fused together and color fringes are reduced to a point where they are not objectionable.

Figure 3:
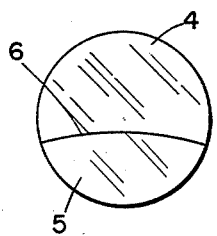
Fig. 3 is a top or plan view of a two part multifocal segment for the lens of the invention.

The two parts of the segment are divided on the line 6, Fig. 3. This line forms the top of the multifocal segment in the finished lens.

The two parts of the segment are fused together along the line 6. A surface to fit in the seat 3 of the base portion 1 is finished on one side of the fused segment, and the fused segment placed in and fused in the seat 3 as shown in Fig. 5.

The power surface 7, designed to give the required optical power of the lens, is finished over the segment portion that has been fused into the seat 3. This power section 7 is circular and central of the base portion 1 and it extends over both the portions 4 and 5 of the segment portion. When the surfaces 2 and 7 have been finished, the blank is of a target shape having the circular central portion 7 for the power or distance vision portion of the lens and the surrounding outer portion 2 for the lenticular carrying portion.

The surfaces 2 and 3 are ground and polished by the regular prior art methods of lens surfacing.

The surface 7 is ground and polished by ring tools, shown in Fig. 8, extending from the edges 8 of the portion 7 and overlapping the center of the portion 7, as shown in Fig. 9, so that the edges 8, are maintained as a sharp line separating the portions 2 and 7.

The ring tool operation is best shown in Figs. 8 and 9. The lens blank is mounted on the lens holder 19 being secured thereto by the pitch coating 18. The lens holder 19 is carried by the spindle 20 rotated by means of the pulley 21 and belt 22.

The ring tool 14 is carried by the spindle 15, rotated by the pulley 16 and belt 17. The tool is mounted to be rotated by the spindle 15. The ring tool 14 extends from the edge 8 of the power portion 7 of the lens to a point beyond the center of the power portion 7, as shown in Fig. 9. With this type of operation, the fine line or edge 8 may be maintained between the surfaces 2 and 7.

The surface 2 may also, if desired, be finished with ring tools that overlap the portion 7 of the lens. With this ring tool operation, the two surfaces 2 and 7 may be finished and related so there will be a fine line 8 between the fields.

Figure 2:
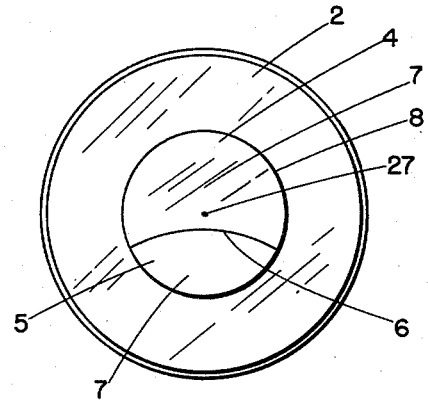
Fig. 2 is a front or plan view of Fig. 1.

The shape of the multifocal segment is best shown in Fig. 2 and indicated by the character 5. This segment extends entirely across the portion 7 of the lens, thus giving a field of the greatest width. With the usual prior art multifocal segments, the portions at the sides were not used for multifocal vision as the segments were of a circular or semi-circular outline departing considerably from the sides of the portion 7. The top of the segment represented by the line 6 is located below the center 27 of the power or distance portion 7 of the lens. As shown in Fig. 10, the centers of curvature of the front and back surfaces of the segment 5 lie substantially on a straight line 28 passing through the centers of curvature of the front and back surfaces of the power or distance portion 7 of the lens, hence the segment or near vision portion is substantially monaxial with the power portion of the lens. Hence, there is substantially little prismatic displacement between the central power portion of the lens and the multifocal portion.

The portion 4 of the segment being of the same lens medium as the base portion 1, the parts 4 and 1 will merge together on fusion and the line 3 under the part 4 will disappear. The multifocal segment part 5 being of a different lens medium will remain visible after fusion.

The power of the multifocal segment 5 will depend on its index of refraction, and the surfaces 7, 3 and 10.

Figure 7:
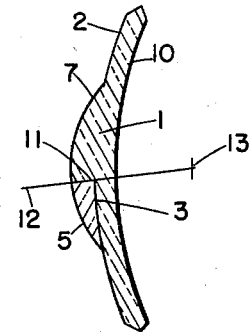
Fig. 7 is a cross section of a finished lens of the invention showing the angle of the top of the multifocal segment.

To prevent interference with the line of vision the top edge 11 of the multifocal segment 5 is angled down, as shown in Fig. 7, being on the line 12 drawn through the center of vision 13.

In Fig. 1, the rear surface 10 is the prescription surface designed to give the required prescription power through the portion 7 of the lens. This surface is put on by the prescription dispenser. The manufacturer makes the blank, finishing the surfaces 7 and 2 on one side.

The prescription surface 10 may be of any required curvature and power, spherical, cylindrical, toric, prismatic, or aspheric as required by the prescription and may be centered on the axis 28 or slightly offset therefrom as desired.

The blank is left thicker than the thickness of the finished lens so the prescription dispenser will have material enough on which to improve the finished prescription surface 10.

From the foregoing, it will be seen I have provided simple, efficient, and economical ways and means for obtaining all of the advantages and objects of the invention by means of a multifocal cataract lenticular lens blank through which medium multifocal cataract lenticular lenses may be dispensed in a minimum of time and more economically by the regular prescription lens dispensers in the art.

In practice, the blanks are arranged in a graded series of powers with a minimum of units to cover the usual range of prescription requirements.

These units are also provided with a minimum number of multifocal powers or additions to cover the usual range of prescription requirements. It has been found in practice that additions of 2.50–3.00 and 3.50 diopters will give adequate service in this connection.

In Figs. 11 and 12, the arrangement and centering of the various parts are shown.

If the center of curvature of the inner surface 3 of the segment 5 is located on the axis line CD at A as shown, the optical centers of the parts 5 and 7 will be at 27 and the lens would be monocentric if the line 6 was tangent with the center 27, but the line 6 is below the center 27 by an amount represented by the shaded portion H in Fig. 11 so there will be a slight displacement of image in passing from the center 27 to the line 6, but the power portion of the lens is so near monocentric as to be negligible for all practical purposes. It is of advantage to make the line 6 slightly below the center 27 to avoid confusion of fields when looking straight ahead through the lens.

If the center A of the inner surface 3 of the segment 5 were not on the axis line as shown in Fig. 11, the lower edges of the segment 5 would not correspond with the line 8 but would in the grinding operations take an outline other than the line 8 as indicated by the dotted line B, Fig. 12. In Fig. 11, the axis line is indicated by CD, the center of curvature of the surfaces 2 and 10 is at F, the center of curvature of the inner surface 3 of the segment 5 is at A, the center of curvature of the outer surface of the surfaces 5 and 7 is at E.

To insure that the edge of the segment 5 is at the line 8, the center of curvature of the face 3 of the segment 5 and the outer face of the segment 5 and the part 7 must be substantially on the axis line CD.

A new and useful multifocal lenticular cataract lens has been provided in which a wide field of multifocal vision is obtained and so related to the central power portion of the lens as to substantially eliminate prismatic displacement between the central power field and the multifocal field.

Having described my invention, I claim:

A multifocal aphakic lens comprising a substantially meniscus-shaped carrier portion formed of transparent material having a given index of refraction, said carrier portion having a circular-shaped seat on one side thereof and a surrounding annular-like surface of convex spherical curvature, a button portion having its inner surface fused on said seat and its exposed surface projecting outwardly from the surrounding annular-like surface and of relatively steep convex spherical curvature, the centers of curvature of said seat, surrounding annular-like surface and exposed surface of the button lying along an axial line passing through the center of the seat, with the adjoining boundaries of said surfaces substantially coinciding, and the radius of curvature of the annular-like surface being substantially longer than the radius of curvature of the exposed surface of the button, said button embodying two pieces of transparent material having different indices of refraction, one having substantially the index of refraction of the carrier portion, the center of curvature of the second piece lying substantially on said axial line passing through the center of the seat, and said two pieces having a line of separation extending transversely of the button to the opposed sides thereof and being positioned below said center of the seat, said carrier portion having on its opposed side a concave curvature extending from edge to edge thereof and defined in any one meridian by a single center disposed adjacent the center of curvature of the annular-like surface on the first side thereof, said concave surface and annular-like convex surface being disposed approximately parallel, and said concave surface being related with the exposed surface of the button, and the indices of refraction of the pieces of the button and the carrier portion to provide a pair of focal fields of controlled different dioptric power through the button while providing negligible power through the surrounding part of the lens.

E. WILLIAM TILLYER.

REFERENCES CITED

The following references are of record in the file of this patent:

UNITED STATES PATENTS

| Number | Name | Date |
|---|---|---|
| 932,965 | Conner | Aug. 31, 1909 |
| 946,571 | Bentzon et al | Jan. 18, 1910 |
| 1,414,117 | Drescher | Apr. 25, 1922 |
| 1,588,783 | Tillyer | June 15, 1926 |
| 1,865,715 | Tillyer | July 5, 1932 |
| 1,880,029 | Tillyer | Sept. 27, 1932 |
| 1,980,401 | Haering | Nov. 13, 1934 |
| 2,049,094 | Tillyer | July 28, 1936 |
| 2,072,593 | Hill | Mar. 2, 1937 |
| 2,129,305 | Feinbloom | Sept. 6, 1938 |
| 2,133,585 | Spero | Oct. 18, 1938 |
| 2,164,801 | Dittmer | July 4, 1939 |
| 2,280,322 | Tillyer | Apr. 21, 1942 |
| 2,410,145 | Bardwell | Oct. 29, 1946 |

FOREIGN PATENTS

| Number | Country | Date |
|---|---|---|
| 312,368 | Germany | May 23, 1919 |
| 235,817 | Great Britain | June 25, 1925 |
| 466,620 | Great Britain | June 1, 1937 |
| 488,828 | Great Britain | July 14, 1938 |

OTHER REFERENCES

Introduction to the Theory of Spectacles, by Otto Henker, published by the Jena School of Optics, 1924, page 222.